Nov. 2, 1937.   A. WHITELAW ET AL   2,097,710
FLEXIBLE CLUTCH FACING
Filed Jan. 22, 1935   2 Sheets-Sheet 1
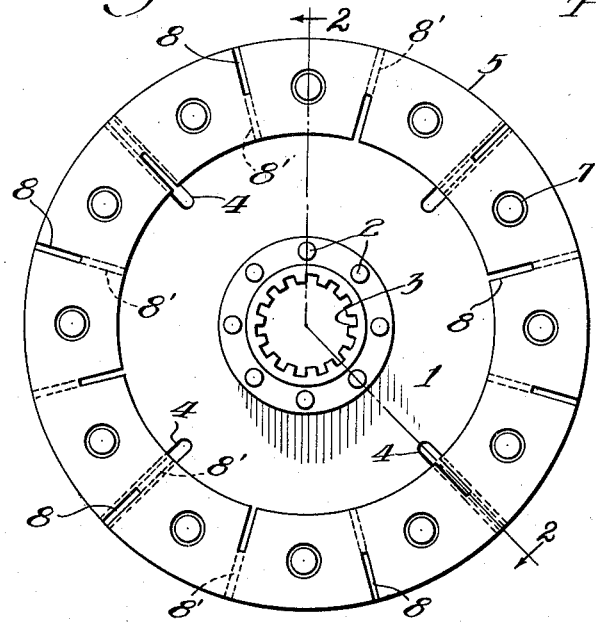
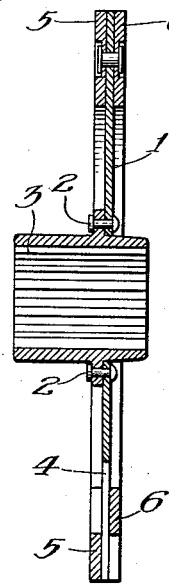
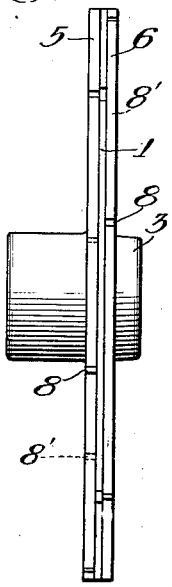
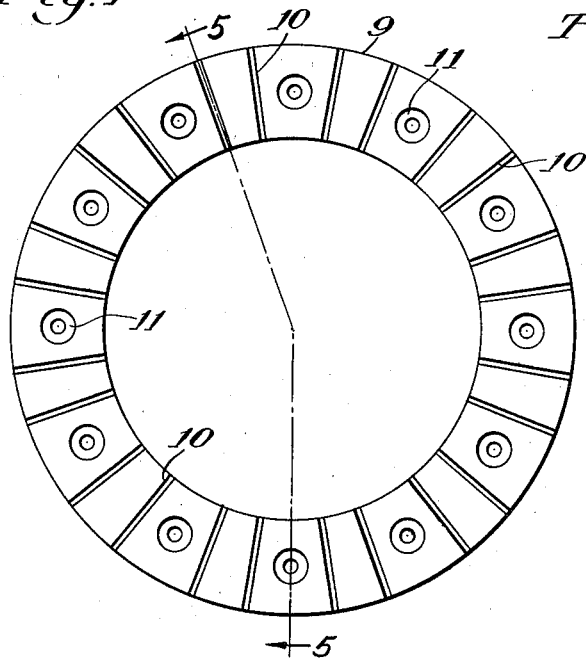
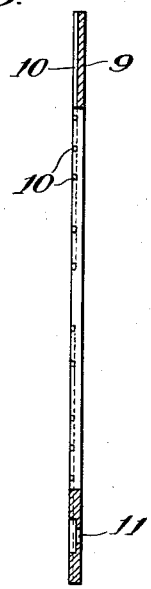

Nov. 2, 1937. A. WHITELAW ET AL 2,097,710
FLEXIBLE CLUTCH FACING
Filed Jan. 22, 1935 2 Sheets-Sheet 2

Inventors:
Albert Whitelaw,
David J. Bonawit.
By Lee J. Gary
Attorney

Patented Nov. 2, 1937

2,097,710

UNITED STATES PATENT OFFICE 2,097,710

FLEXIBLE CLUTCH FACING

Albert Whitelaw, Passaic, and David J. Bonawit, Glen Park, N. J., assignors to Raybestos-Manhattan, Inc., Passaic, N. J., a corporation of New Jersey Application January 22, 1935, Serial No. 2,938

3 Claims. (Cl. 192—107)

This invention relates to friction facings for clutches employed in motor vehicles, and has application generally to friction facings for clutches of the disc type.

More specifically, the invention relates to improvements in clutch facings to provide a woven or molded clutch facing which, although intrinsically strong, is sufficiently resilient or flexible to conform with irregularities of the clutch disc upon which it may be mounted.

In the conventional type of automobile clutch now in use, it is general practice to employ the fly-wheel and the pressure plate as the driving or engaging portion of the mechanism. The faces of these parts are flat and smooth. The driven member usually comprises a relatively thin disc of metal, having a splined hub to fit the clutch shaft. Clutch facings are usually attached by means of rivets or the like adjacent the outer periphery of the driven disc. Generally, the metal disc of the driven member is slotted, crimped or dished in such a manner that when the driving and driven members engage, only a point or line contact is made at the initial part of the engagement, and gradually the entire faces of the engaging members are brought into full contact. The object of this is to secure smooth and gradual engagement of the clutch.

It has been common practice to use two general types of friction facings in the type of mechanism above described, one constructed of treated asbestos fabrics, made of either folded asbestos cloth or woven asbestos tapes which have been properly impregnated or coated, and the other general type has been made of asbestos pulp which may have been extruded or cut from a sheet made by either a calender or paper machine. We have observed that when a stiff facing is securely riveted to the driven member, due to its stiffness, either reduces the crimp, that is, tends to flatten the same, or fails to follow the contour of the crimp or dished faces of the metal plate of the driven member. Such facings start their engagement with substantially their entire surface in contact, rather than with line or spot contact, and rough or chattering engagement ensues. On the other hand, if a facing is relatively flexible and readily follows and accommodates itself to the contours of the crimped or dished surfaces of the disc, then invariably a smooth engagement results.

It is an object of our invention, therefore, to provide a clutch facing which will inherently possess the desirable characteristics referred to, and which, though relatively rigid, strong and durable will possess sufficient resiliency to readily adapt and conform itself to the irregularities existent upon the clutch disc surface.

Other and further objects and advantages of the invention will become apparent from the following description and accompanying drawings, which are merely diagrammatic and in no wise to scale; and wherein,—

Fig. 1 is a face or plan view of one form of friction facing, shown in mounted relation upon a conventional clutch disc;

Fig. 2 is a side elevational, sectional view, taken on a line 2—2 of Fig. 1;

Fig. 3 is a side-elevational view of Fig. 1;

Fig. 4 is a face or plan view of a modified form of facing of my invention; and

Fig. 5 is a sectional, side-elevational view of Fig. 4, taken on a line 5—5 thereof.

Figure 6:
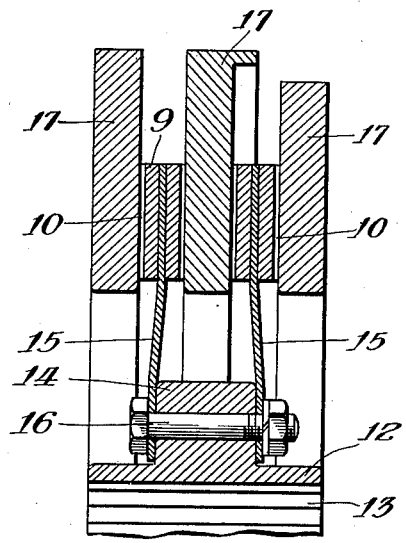
Fig. 6 is a fragmentary sectional view of a multiple plate clutch having facings similar to those shown in Figs. 4 and 5.

Referring to the drawings, and more particularly to Figs. 1 to 3, inclusive, a conventional form of clutch mechanism is shown, provided with a metallic clutch disc 1, suitably secured through means of rivets 2, to a splined hub member 3, adapted to receive and engage the usual clutch shaft (not shown). Integrally or otherwise formed on the disc 1, and extending generally from its substantial mean to outer circumference, are a plurality of radially extending, spacedly disposed slots or surface grooves 4 which may, if desired, be adapted to produce and effect a substantially irregular, distorted surface or face upon said disc 1; in order to induce spot or line contact initial engagement therefor with a driving member (not shown).

Disposed in operable relationship over a portion of one face of the disc 1 and the grooves 4, is an annular friction facing 5, while similarly operably disposed over a portion of the opposite face of said disc 1 and the grooves 4, is a similar annular friction facing ring 6, both of said facings 5 and 6 being secured for operative relationship with said disc 1 by common means, such as the countersunk rivets 7. Said facing rings 5 and 6 may comprise any desired composition friction facing material, such as, for example, the treated asbestos fabric or asbestos pulp types hereinabove referred to.

In accordance with the present invention, the annular facings 5 and 6 may be suitably preformed, cut or otherwise provided with a plurality of radial, circumferentially spaced elongated slots or apertures 8 and 8', adapted to extend throughout the annular facings 5 and 6 preferably in alternate, staggered relation to each other, from a point commencing substantially at the mean circumference of each facing and extending to substantially the outer and internal peripheries thereof. Specifically, where an aperture 8 or 8' extends, say, from the mean to the outer circumference of a given facing, staggered relationship thereof with respect to the remaining apertures is brought about by radially positioning both the next succeeding and the next preceding apertures in spaced relation therefrom, and causing the same to extend, say, from substantially the mean circumference to the internal periphery of said facing, or vice versa. And such staggering of aperture with respect to the preceding or succeeding aperture is continued throughout the remaining area of each facing, thereby effecting an arrangement and positioning of apertures 8 and 8' which will avoid any undue weakening of the facing structure while inducing the desired flexibility sought.

The apertures 8 and 8' in the facings 5 and 6, may be of any desired length, width and number. Such length, width, depth and number will be governed by the type of mechanism in which the facings are to be associated, the number and location of the retaining securing rivets, as well as the type and character of composition of the facing itself. Said apertures 8 and 8', however, shall be in sufficient number to impart desired flexibility in said facings so that each will readily adapt itself to irregularities in the surface of a disc, while retaining in said facing that amount of strength, rigidity and stiffness which is necessary and requisite to adequately support the securing rivets, withstand centrifugal force and insure long wearing life.

In assembly for operation, annular facings 5 and 6 are oppositely secured to the two faces of the disc 1 by means of retaining rivets 7. Radial grooves 4 of said disc are preferably in registry with coinciding apertures 8 and 8' of the facings, whereby each coinciding aperture on both faces of the disc will, in its entirety, extend over and upon such grooves 4, while the radial balance or unslotted portion of the facings will adjacently contact the remainder of such groove. In addition, facings 5 and 6 are so oppositely positioned with respect to each other on the faces of the disc 1, that their apertures 8 and 8', respectively, will be radially substantially continuous, if it were possible to submerge and make common their planes; and, from a face or plan view as shown in the drawings, each aperture 8 and 8' when operatively secured to the disc 1, will possess substantially the same center line. For example, taking a single radial groove 4, when facing 5, say, is secured to an opposed face of the disc, an aperture 8 thereof will register with and extend over said groove to the extent that it is provided in said facing, viz., from the mean to the internal circumference thereof. On the other hand, aperture 8' of facing 6 secured on the opposite face of the disc 1, will likewise register with a portion of the groove 4 to the extent that it is provided in said facing 6, viz., from the mean to the outer periphery thereof. Thus, except for the interpositioning of disc member 1 and its grooves 4, apertures 8 and 8' of facings 5 and 6, respectively, are rendered radially more or less continuous with respect to each other.

In the modification of the invention exemplified in Figs. 4 and 5, there is shown a friction facing 9, comprised of any desired type of composition material, such as one of the general types hereinabove referred to. In order to render such facing flexible in character, there may be provided upon the face thereof through machining, preforming, or otherwise during manufacture, a plurality of recesses, grooves or depressions 10, each radially extending throughout said facing and spacedly disposed from each other. A sufficient number of said recesses is provided upon the facing to render the same substantially adaptable to conform to the distorted surfaces of a disc element to which it may be applied and secured by means of rivets insertable in the apertures 11. The number, width and depth of the depressions 10 will, of course, depend upon the flexibility of facing desired, the number and location of the rivet receiving apertures 11 and the type and composition of the facing itself, as well as the clutch mechanism with which said facing is to be associated.

Referring particularly to Fig. 6, a typical application of flexible clutch facings embodying the conception of our invention is shown. The structure is that of a multiple plate clutch and comprises the usual hub 12 having splines 13 for engagement with the clutch shaft. An annular projection 14 may be provided as an integral portion of hub 12 and is adapted to carry clutch plates 15 constructed of a relatively resilient metallic material, said clutch plates being secured to the annular projection 14 by means of bolts 16 or the like. Clutch facings 9 having radial recesses or slots 10 may be secured to each face of the clutch plates 15 adjacent their outer periphery. Each of the clutch plates 15 may be positioned between pressure plates 17. This structure comprises a conventional multiplate clutch.

In the operation of a clutch similar to that shown in Fig. 6, engagement is secured by sliding the pressure plates 17 into contact with the clutch facings 9. Fig. 6 shows the clutch in engaged position and as can be seen engagement results in flexing or dishing the clutch plates 15. In a clutch of this type it is desirable that the friction facings be possessed of a degree of flexibility in order to secure smooth engagement and to prevent excessive wear of the facings. Consequently, by utilizing clutch facing 9 having the radial recesses or slots 10, such flexibility is imparted to the facing and a smoother more efficient clutch operation results.

Figure 7:
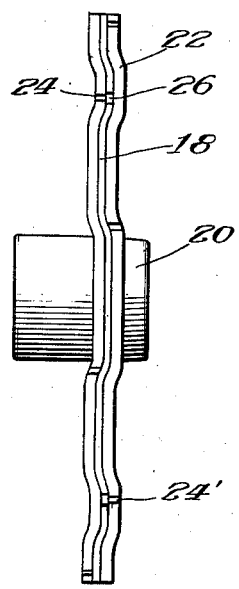
Fig. 7 is a side elevational view of a crimped clutch plate carrying facings similar to those shown in Figs. 1, 2 and 3.
Figure 8:
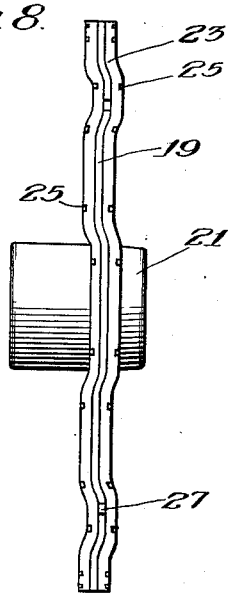
Fig. 8 is a similar view of a crimped clutch plate carrying facings similar to those shown in Figs. 4 and 5.

Referring particularly to Figs. 7 and 8, clutch plates 18 and 19 mounted respectively upon the usual hubs 20 and 21 are shown. The clutch plates 18 and 19 are similar in construction and are characterized in that the surfaces thereof, particularly the surfaces adjacent the outer peripheries are crimped or corrugated. In Fig. 7 a pair of clutch facings 22 similar to the facings 5 and 6 shown in Figs. 1, 2 and 3 may be secured by rivets or the like (not shown) to the faces of the plate 18. In Fig. 7 a pair of friction facings 23 similar to the facing 9 shown in Figs. 4 and 5 are secured by conventional means to the clutch plate 19. It can readily be seen that in order for the facings 22 and 23 to conform to the crimped or corrugated surfaces of the plates 18 and 19, the same must be possessed of a relatively high degree of flexibility. By the provision of the slots 24 and 24' in the opposite facings 22 upon plate 18, such flexibility is secured. Similarly, by the provision of the radial recesses or slots 25 similar to the slots 10 in the clutch facing 9, the facings 23 are permitted to conform with the irregularities of the surfaces of the plate 19.

In the utilization of clutch plates of the type shown in Figs. 7 and 8, initial engagement involves contact of only a portion of the areas of the clutch facings and, consequently, said initial engagement is smooth and vibrationless. Depending upon the degree of flexibility of the clutch plates 18 and 19, final engagement of the pressure plates (not shown) may result in the flattening of the clutch plates 18 and 19 and the facings 22 and 23 whereby maximum area of the friction facings in engagement is obtained. To permit the flattening of the clutch plates 18 and 19, slots or recesses 26 and 27 may be provided in the plates 18 and 19 respectively.

While we have illustrated and described our invention as applicable to the forms above, it obviously has ready adaptability in other forms, the above being merely preferable exemplifications thereof.

We claim as our invention:—

1. A facing adapted to be secured to a driven clutch plate of a clutch of the disc type, comprising an annular facing, having a plurality of elongated apertures radially disposed about said facing to impart resiliency to the facing, said apertures extending from substantially the internal and outer peripheries of said annular facing to substantially the mean circumference thereof.

2. An annular facing adapted to be secured to a driven clutch plate of a clutch of the disc type, having a plurality of spaced, elongated apertures radially disposed about said facing and extending alternately from the internal and outer peripheries of said annular facing to substantially the mean circumference thereof to impart resiliency to said facing.

3. In combination with a clutch element of the disc type provided with a distorted surface contour, an annular friction facing therefor, having a plurality of radially extending spacedly disposed elongated apertures upon the face of said annular facing, all of said apertures being substantially uniform in width and extending in staggered relationship to each other from the internal and outer peripheries of said facing to substantially the mean circumference thereof.

ALBERT WHITELAW.
DAVID J. BONAWIT.